(12) United States Patent
Yamada

(10) Patent No.: US 8,854,672 B2
(45) Date of Patent: Oct. 7, 2014

(54) PRINTING APPARATUS

(71) Applicant: Akihiro Yamada, Aichi (JP)

(72) Inventor: Akihiro Yamada, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 78 days.

(21) Appl. No.: 13/624,407

(22) Filed: Sep. 21, 2012

(65) Prior Publication Data
US 2013/0107319 A1 May 2, 2013

(30) Foreign Application Priority Data
Oct. 26, 2011 (JP) .................. 2011-234661

(51) Int. Cl.
G06F 3/12 (2006.01)
G06K 15/00 (2006.01)

(52) U.S. Cl.
CPC ............ *G06F 3/1204* (2013.01); *G06F 3/126* (2013.01); *G06F 3/1229* (2013.01); *G06F 3/1288* (2013.01); *G06F 3/1232* (2013.01)
USPC ........................................ 358/1.15; 358/1.14

(58) Field of Classification Search
CPC ...... G06F 3/1297; G06F 3/12; H04N 1/00204

USPC ................... 358/1.1–1.9, 1.11–1.18
See application file for complete search history.

(56) References Cited

U.S. PATENT DOCUMENTS

| | | | |
|---|---|---|---|
| 2006/0043166 A1 | 3/2006 | Matsumoto et al. | |
| 2007/0245345 A1* | 10/2007 | Yamada | 717/174 |
| 2009/0164668 A1* | 6/2009 | Duckett | 710/9 |

FOREIGN PATENT DOCUMENTS

| | | |
|---|---|---|
| JP | 2003-330686 A | 11/2003 |
| JP | 2006-065432 A | 3/2006 |

* cited by examiner

*Primary Examiner* — King Poon
*Assistant Examiner* — Ibrahim Siddo
(74) *Attorney, Agent, or Firm* — Scully, Scott, Murphy & Presser, PC

(57) ABSTRACT

A printing apparatus including: a connecting unit connected to a management server through a network; a printing unit configured to print of print data received through the network; a receiving unit configured to receive input of a name indicating the printing apparatus; a determining unit configured to determine whether another printing apparatus having a same name as the name received by the receiving unit exists; and a prohibiting unit configured to prohibit the printing unit from performing printing if the other printing apparatus having the same name exists.

8 Claims, 9 Drawing Sheets

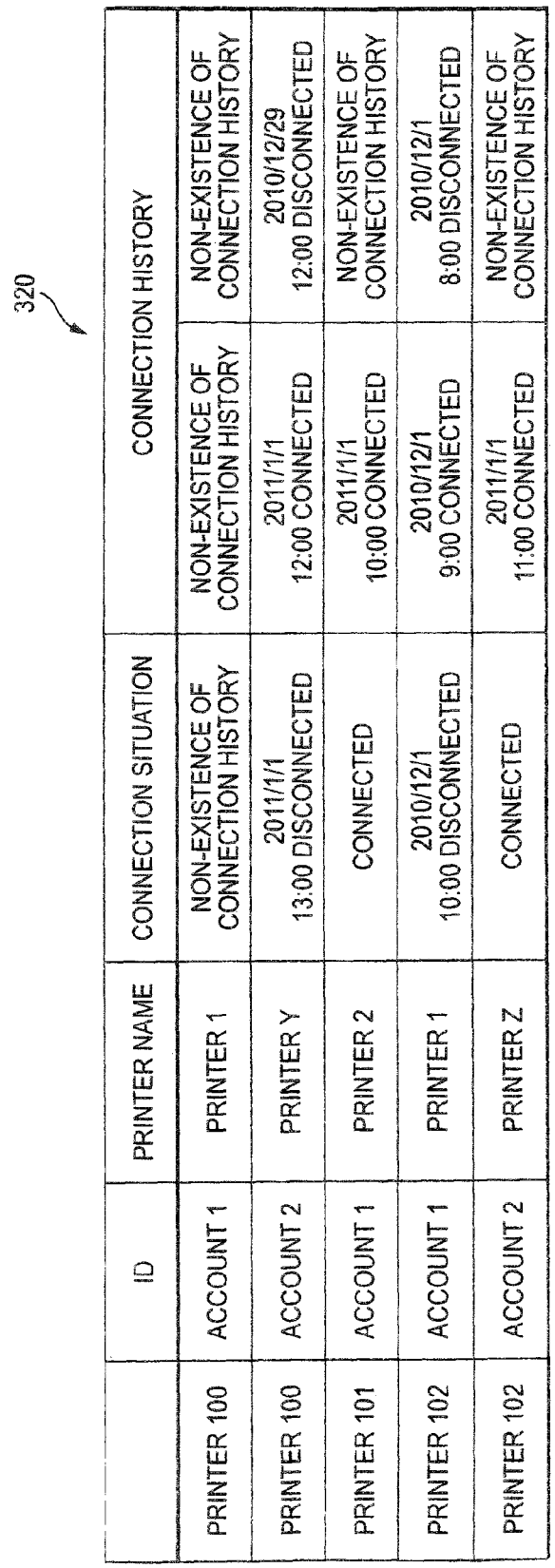

FIG. 3

| ID | PRINTER NAME | CONNECTION SITUATION | CONNECTION HISTORY | |
|---|---|---|---|---|
| PRINTER 100 | ACCOUNT 1 | PRINTER 1 | NON-EXISTENCE OF CONNECTION HISTORY | NON-EXISTENCE OF CONNECTION HISTORY | NON-EXISTENCE OF CONNECTION HISTORY |
| PRINTER 100 | ACCOUNT 2 | PRINTER Y | 2011/1/1 13:00 DISCONNECTED | 2011/1/1 12:00 CONNECTED | 2010/12/29 12:00 DISCONNECTED |
| PRINTER 101 | ACCOUNT 1 | PRINTER 2 | CONNECTED | 2011/1/1 10:00 CONNECTED | NON-EXISTENCE OF CONNECTION HISTORY |
| PRINTER 102 | ACCOUNT 1 | PRINTER 1 | 2010/12/1 10:00 DISCONNECTED | 2010/12/1 9:00 CONNECTED | 2010/12/1 8:00 DISCONNECTED |
| PRINTER 102 | ACCOUNT 2 | PRINTER Z | CONNECTED | 2011/1/1 11:00 CONNECTED | NON-EXISTENCE OF CONNECTION HISTORY | ns
PRINTING APPARATUS

CROSS-REFERENCE TO RELATED APPLICATIONS

This application claims priority from Japanese Patent Application No. 2011-234661 filed on Oct. 26, 2011, the entire contents of which are incorporated herein by reference.

TECHNICAL FIELD

The present invention relates to a printing apparatus which is connected to an information processing apparatus through a network, receives print data from the information processing apparatus through a print server, and prints the print data.

BACKGROUND

There are printing systems in which printing apparatuses and information processing apparatuses are connected through a network, and the printing apparatuses receive print data from the information processing apparatuses through a print server and print the print data. An example of the printing systems is disclosed in JP-A-2003-330686. In this system, when a user uses a printing apparatus, an information processing apparatus queries a print server, and the print server allows printing on condition that an upper limit number of printing sheets is not exceeded.

SUMMARY

However, when registering names of the printing apparatuses, a plurality of printing apparatuses having the same name may be registered. Therefore, print data may be input to another printing apparatus with the same name as that of a printing apparatus which a user intended to use for printing. In this case, if printing is executed, the unintended printing apparatus with the same name as that of the intended printing apparatus prints the print data.

An object of the present invention is to provide a printing apparatus capable of preventing printing from being performed in a user's unintended printing apparatus having a same name as that of the printing apparatus.

According to an aspect of the invention, there is provided a printing apparatus including: a connecting unit connected to a management server through a network; a printing unit configured to print of print data received through the network; a receiving unit configured to receive input of a name indicating the printing apparatus; a determining unit configured to determine whether another printing apparatus having the a same name as the name received by the receiving unit exists; and a prohibiting unit configured to prohibit the printing unit from performing printing if the other printing apparatus having the same name exists.

According to this configuration, if there is another printing apparatus with the same name as that of the printing apparatus, printing of print data is not performed. Therefore, it is possible to prevent printing from being performed in a user's unintended printing apparatus having the same name as that of the printing apparatus.

BRIEF DESCRIPTION OF DRAWINGS

FIG. 3 is a view illustrating an example of a printer list common to the first to third exemplary embodiments of the present invention;

DETAILED DESCRIPTION

First Exemplary Embodiment

Hereinafter, a first exemplary embodiment of a printing apparatus of the present invention will be described with reference to the accompanying drawings. In the present exemplary embodiment, the present invention is applied to a printer having a function of acquiring print target data from a web page and printing the print target data.

Configuration of Printer

Figure 1:
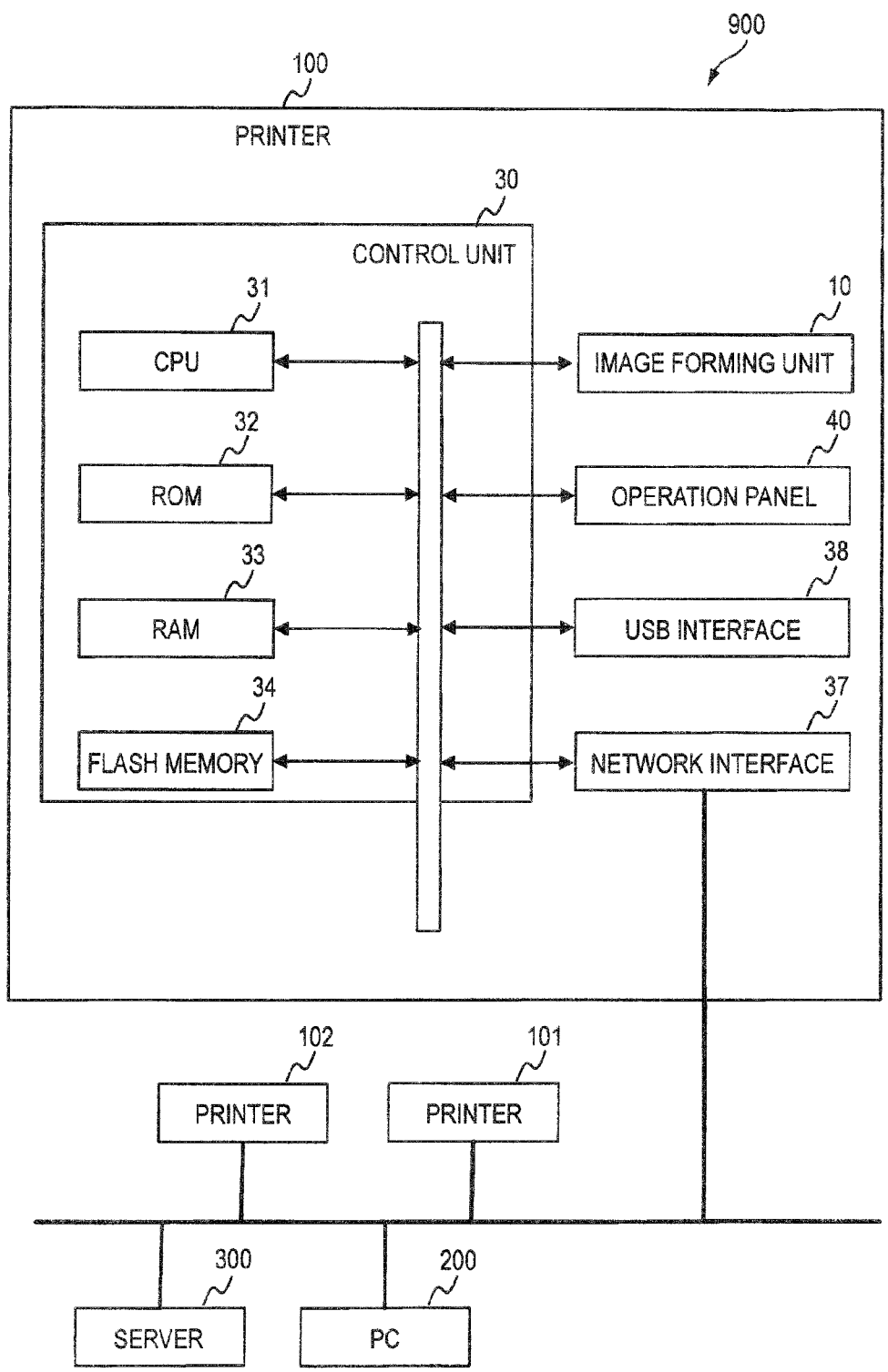
FIG. 1 is a block diagram illustrating an electrical configuration of a printer common to first to third exemplary embodiments of the present invention.

As shown in FIG. 1, a printer 100 (an example of a printing apparatus) of the present exemplary embodiment includes a control unit 30, which includes a CPU 31, a ROM 32, a RAM 33, and a flash memory 34. Also, the control unit 30 is electrically connected to an image forming unit 10, an operation panel 40, a network interface 37, and a Universal Serial Bus (USB) interface 38. The image forming unit 10 prints images to sheets, and the operation panel 40 displays operation situations and receives user's input operation.

The ROM 32 stores firmware that is control programs for controlling the printer 100, various options, initial values, and so on. The RAM 33 and the flash memory 34 (examples of a storage unit of claims) are used as a work area from which various control programs are read or a storage area for temporarily storing print data.

The flash memory 34 is non-volatile and thus can keep data even if a power supply is turned off. Also, the flash memory 34 is used as a storage area for storing various settings set after shipment by a user. For example, the flash memory 34 stores the printer name of the printer 100 and account information. When the printer name of the printer 100 is changed, the CPU 31 and the flash memory 34 cooperate, thereby acting as an example of a changing unit. The printer name is configured by letters, symbols, and the like such that the user of the printer or a personal computer (PC) 200 (to be described below) can identify the printer. For example, the printer name may be a model name determined by the maker of the printer, or may be arbitrarily determined by the user.

The CPU 31 (an example of a determining unit or a prohibiting unit) controls each component of the printer 100 while storing process results in the RAM 33 or the flash memory 34 according to control programs read from the ROM 32 and signals transmitted from various sensors.

The network interface 37 (an example of a connecting) and the USB interface 38 enable communication with other apparatuses. The printer 100 receives data transmitted from other apparatuses through those interfaces.

In the present exemplary embodiment, the printer 100 is capable of communicating with the PC 200 and a management server 300 through the network interface 37. The printer 100 and communication apparatuses such as the PC 200 and the management server 300 configure a printing system 900.

Also, the printer 100 may use other apparatuses through the USB interface 38. For example, in a case where a keyboard is installed into the USB interface 38, it is possible to use the keyboard to perform input operation.

Also, the image forming unit 10 (an example of a printing unit) needs only to print images onto sheets. Therefore, the image forming system of the image forming unit 10 may be an electrophotographic system or an inkjet system. The image forming unit 10 may be capable of color printing or may be only for monochrome printing.

The operation panel 40 (an example of a receiving unit or a communication unit) includes various buttons for receiving user's input, and a touch panel screen for displaying text information, buttons, and so on. For example, the various bottoms include an 'OK' button for instructing start of a printing operation, a 'CANCEL' button for instructing cancellation of a printing operation, and letter buttons for allowing the user to input the URLs of web pages.

Configuration of Management Sever

The management server 300 is for intermediating printing of the printer 100, a printer 101, and a printer 102. The management server 300 is not a server provided by the vendor of the printer 100, the printer 101, and the printer 102, but is a server provided by a company providing cloud printing (hereinafter, referred to as a partner company).

The management server 300 stores printer information 320 in a memory area 310 of the management server 300. Also, the management server 300 includes a decompressing unit 330 which decompresses image data having a PDF, a JPEG format, or the like such that the printer 100 can print the image data. The printer information 320 includes a user ID, Auth-token, and a printer name stored in association with one another. The user ID is an ID provided from the partner company, and the Authtoken is identification information assigned to a user when the user uses the user ID to log in to the management server 300.

Also, since the user ID and the Authtoken are associated with each other in the management server, during log-in, if the user ID is received, it is unnecessary to input something with respect to the Authtoken.

Configuration of Printing System

Subsequently the configuration and operation of the printing system 900 including the printer 100 will be described with reference to FIG. 2.

In the printing system 900, if the PC 200 receives the account information such as a password and the user ID, the PC 200 logs in to the management server 300, whereby connection of the PC 200 and the management server 300 is established. Similarly to the PC 200, if the printer 100 receives the account information, the printer 100 signs in to the management server 300 (an example of 'connection'), whereby connection of the printer 100 and the management server 300 is established.

In short, the printing system 900 is configured such that if the same account information is used for the PC 200 to log in to the management server 300 and the printer 100 to sign in to the management server 300, the PC 200 can designate the printer 100 to perform printing.

In the specification, for descriptive purposes, account information input by the user from the PC 200 to the management server 300 for establishing the connection of the PC 200 and the management server 300 is referred to as log-in, and account information input by the user from the printer 100 to the management server 300 for establishing the connection of the printer 100 and the management server 300 is referred to as sign-in.

Also, in the specification, the connection and disconnection of the management server 300 and the printer 100 are not limited to physical connection and disconnection. The connection includes a state where data communication is possible, and the disconnection includes a state where data communication is not possible.

Figure 2:
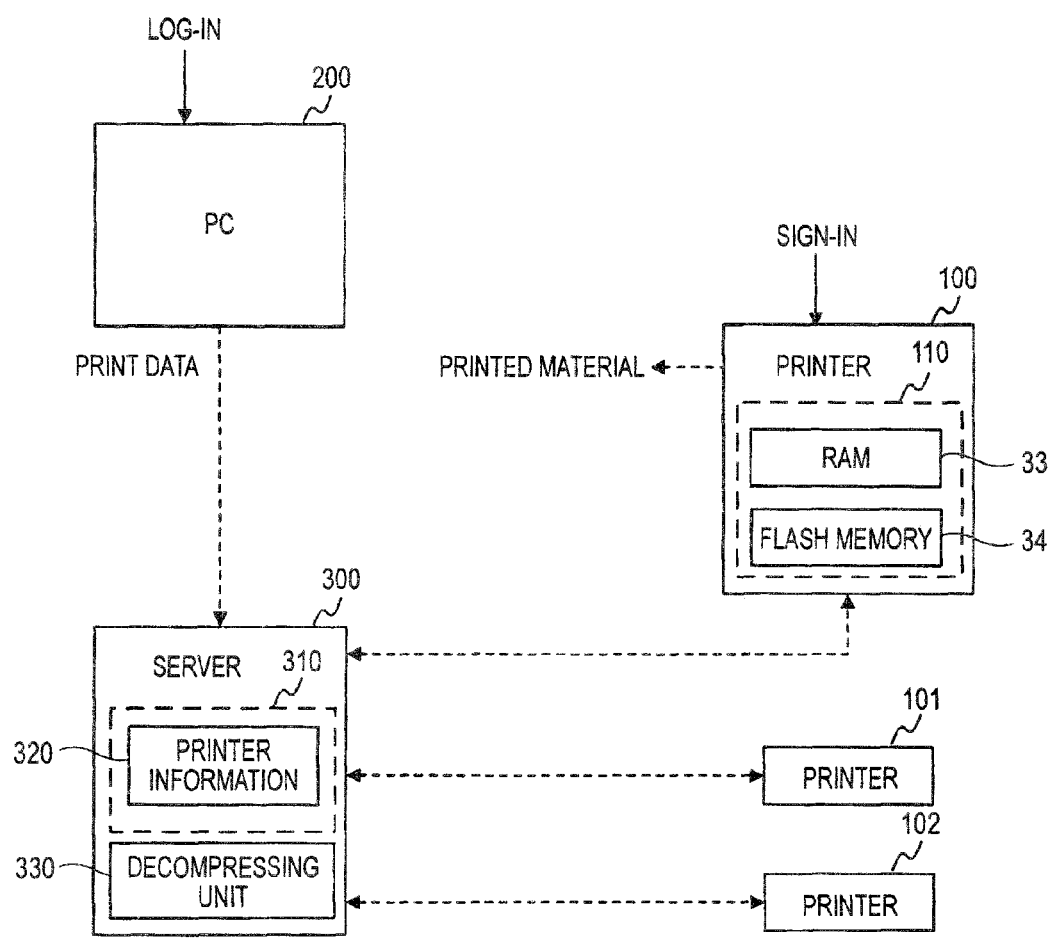
FIG. 2 is a block diagram schematically illustrating an operation of a printing system common to the first to third exemplary embodiments of the present invention.

In the printing system 900 shown in FIG. 2, like the printer 100, the printer 101 and the printer 102 use the same account information to sign in to the management server 300. In this case, the PC 200 displays the printer 100, the printer 101, and the printer 102 as choices on a display of the PC 200, such that it is possible to designate any one of the choices to perform printing. The choices may be generated by any one printer of the printer 100, the printer 101, and the printer 102, or may be generated by the management server 300.

For example, if the PC 200 receives a print instruction for the printer 100 from the user, the PC 200 transmits image data having a PDF, a JPEG format, or the like to the management server 300. In the management server 300, the decompressing unit 330 decompresses the image data to generate print data. In other words, the management server 300 acts as a printer driver. Then, the print data is transmitted from the PC 200 to the printer 100 through the management server 300.

After receiving the print data, the printer 100 starts to print the print data. That is, after issuing the print instruction to the printer 100, the user goes to a place where the printer 100 is installed. Accordingly, the user can obtain the printed material.

However, in the above-mentioned printing procedure, for example, in a case where the printer name of the printer 100 is the same as the name of the printer 102, even if the user intends to issue a print instruction to the printer 102, actually, the print instruction may be issued to the printer 100.

In this case, even if the user goes to a place where the printer 102 is installed, the user cannot obtain the printed material, and the printing material may be left at the printer 100. For this reason, a third party may take or see the printed material. Therefore, there is a risk that information of the printed material may leak. For example, in a case where it is intended to configure the printing system 900 by purchasing multiple printers of the same model, if the model numbers of the printers are automatically set as the names of the printers, the above-mentioned problem may occur.

For this reason, the printer 100 stores the printer name of the printer 100 in the flash memory 34. Then, when registering the printer name, the printer 100 downloads the printer information 320, which is a list of the printer names of printers which are in a signed in state with the same account information, from the management server 300, and determines whether there is any other printer with the same printer name as that of the printer 100 (hereinafter, also referred to as a same name printer) (an example of another printing apparatus with the same name) in the downloaded printer information 320. In a case where a same name printer exists, the printer 100 does not perform sign-in and notifies the user that since a same name printer exists, sign-in is not possible.

In other words, when one of the printer 100 and the printer 102 having the same name is in the signed in state to the management server 300, sign-in of the other printer with the same name is prohibited.

Therefore, the user cannot designate the printer 100 with the same name as that of the printer 102 to receive the print data. As a result, it is possible to prevent the printed material from being left at the printer 100.

Also, it is assumed that the printer 101 and the printer 102 have registered their printer names and signed in to the management server 300 by using the account information for sign-in of the printer 100, earlier than the printer 100 does the same, Further, it is assumed that information of printers having signed in to the management server 300 in the past is stored in the printer information 320.

Control of Printer

Subsequently, the control of the printer 100 for implementing the above-mentioned operation of the printing system 900 will be described. As described above, the operation of the printer 100 includes prohibiting sign-in in a case where the same name printer exists in a sign-in process. Hereinafter, the operation of the sign-in process will be mainly described.

Sign-in Process

The sign-in process will be described with reference to FIG. 4. For example, if the user operates the operation panel 40 to select an item 'SIGN-IN PROCESS' from items displayed on the operation panel 40 and pushes the 'OK' button, the sign-in process starts.

First, in STEP S101, the CPU 31 receives a printer name and account information (an example of connection information) input from the operation panel 40 by the user. Then, the CPU 31 stores the printer name and the account information received by the operation panel 40 in the RAM 33. At this time, the printer name and the account information are just temporarily stored, and printer information has not been registered.

Next, in STEP S102, the CPU 31 determines whether any request for sign-in to the management server 300 (hereinafter, referred to as a sign-in request) has been made from the printer 100. For example, the CPU 31 determines whether an ID and a password has been input on a screen for receiving an ID, a password, and the like for sign-in displayed, an item 'CONNECTION' and has been selected on the operation panel 40, and the 'OK' button has been pushed.

In a case where a sign-in request has not been made (NO in STEP S102), the CPU 31 waits for a sign-in request. Meanwhile, in a case where a sign-in request has been made (YES in STEP S102), in STEP S103, the CPU 31 reads the account information stored in the RAM 33.

Next, in STEP S104, the CPU 31 notifies the management server 300 of the read account information, and acquires the printer information 320, including at least a printer name with respect to each printer with the same account information as the read account information, from the management server 300. Subsequently, in STEP S105, the CPU 31 performs a registration determining process using the printer information 320.

Registration Determining Process

Figure 5:
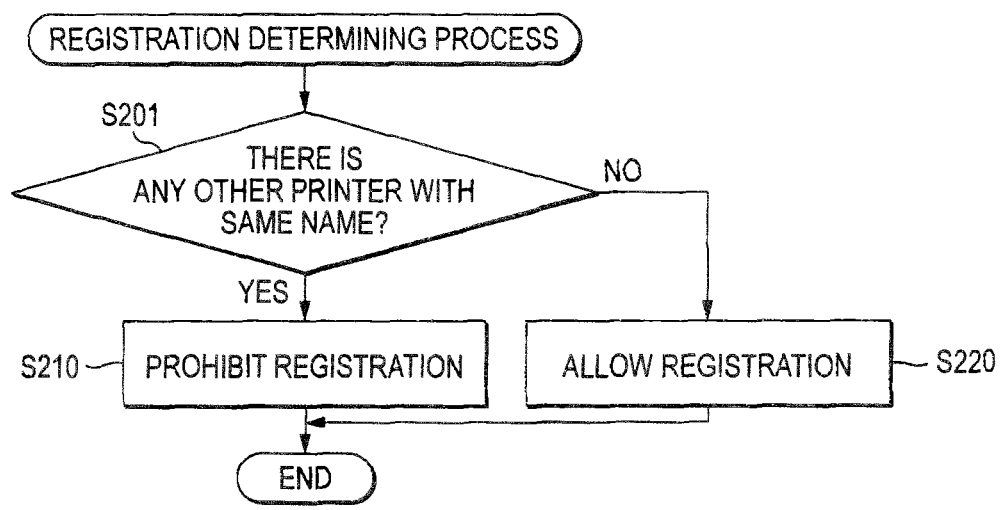
FIG. 5 is a flow chart illustrating a procedure of a registration determining process according to the first exemplary embodiment.

The registration determining process will be described with reference to FIG. 5. First, in STEP S201, the CPU 31 searches the printer information 320 acquired in STEP S104 and compares with the printer name temporarily stored in the RAM 33, thereby determining whether there is a same name printer in the printer information 320.

In a case of determining that there is a same name printer in the printer information 320 (YES in STEP S201), the CPU 31 prohibits registration of the printer name in STEP S210, and terminates the registration determining process. Here, the prohibition of the registration of the printer name means that the CPU 31 does not store the printer name received in STEP S101 in the flash memory 34.

Meanwhile, in a case of determining that there is no same name printer in the printer information 320 (NO in STEP S201), the CPU 31 allows the registration of the printer name in STEP S220, and terminates the registration determining process, if the CPU 31 allows the registration in STEP S220, the CPU 31 separately stores the printer name received in STEP S101 in the flash memory 34, thereby registering the printer name.

Figure 4:
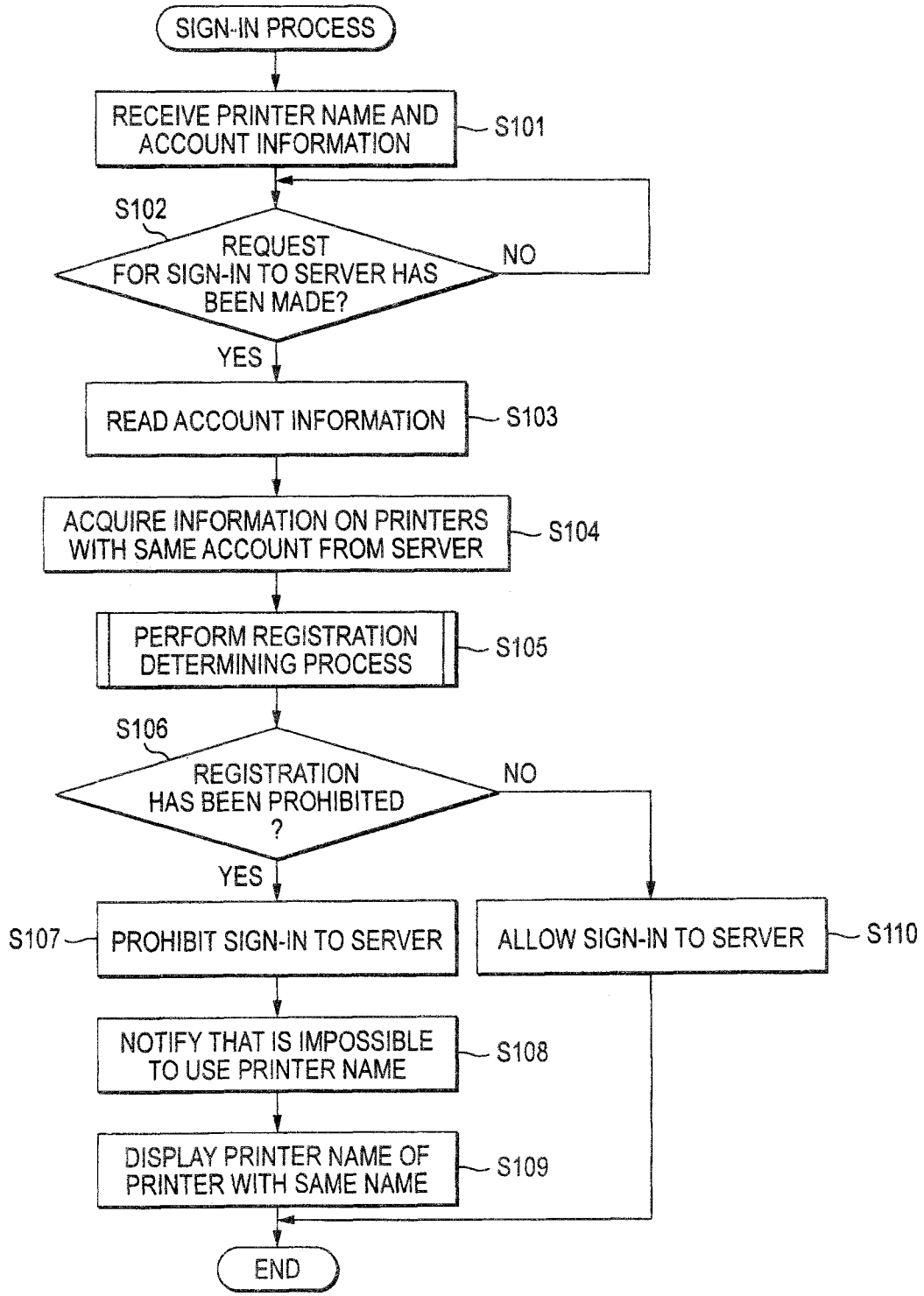
FIG. 4 is a flow chart illustrating a procedure of a sign-in process common to the first to third exemplary embodiments of the present invention.

Returning to the sign-in process of FIG. 4, in STEP S106, the CPU 31 determines whether the registration of the printer name has been prohibited in the registration determining process.

In a case of determining that the registration of the printer name has been prohibited (YES in STEP S106), in STEP S107, the CPU 31 does not transmit the account information received in STEP S101 to the management server 300, whereby prohibiting the printer 100 from signing in to the management server 300 (an example of the prohibiting unit). In other words, in the printing system 900, unless the printer 100 signs in to the management server 300, the printer 100 cannot perform printing of print data. Therefore, omitting sign-in to the management server 300 is equivalent to the prohibition of printing of print data.

Next, in STEP S108, the CPU 31 notifies the user that it is impossible to use the printer name received in STEP S101, through the operation panel 40. Then, in STEP S109, the CPU 31 displays the printer name of another printer with the same account information as the read account information on the operation panel 40, and terminates the sign-in process.

After STEP S109, if the user pushes the 'OK' button, the CPU 31 displays a screen for inputting a printer name on the operation panel 40, thereby urging the user to input another printer name. Then, if the user inputs another printer name different from the printer name displayed in STEP S109, and pushes the 'OK' button, the CPU 31 transmits the account information received in STEP S101 to the management server 300, whereby sign-in to the management server 300 is performed from the printer 100.

Meanwhile, in a case of determining that the registration of the printer name has not been prohibited (NO in STEP S106), the CPU 31 allows sign-in to the management server 300 to be performed from the printer 100 in STEP S110, and terminates the sign-in process. In this case, since the sign-in is performed, if a notification representing that there is print data designating the printer 100 in the management server 300 is received from the management server 300, the printer 100 acquires the print data from the management server 300, and prints the print data. In other words, printing of print data is not prohibited.

Effects of First Exemplary Embodiment

As described above in detail, in the printing apparatus according to the first exemplary embodiment, in the case of determining that there is a same name printer in the printer information 320 (YES in STEP S201), in STEP S210, the CPU 31 prohibits the registration of the printer name. Then, in a case of determining that the registration of the printer name has been prohibited (YES in STEP S106), in STEP S107, the CPU 31 prohibits sign-in to the management server 300 from being performed from the printer 100. Therefore, in the case where there is a same name printer, printing of print data is not performed. As a result, it is possible to prevent printing from being performed by a same name printer unintended by the user.

Also, the CPU 31 stores the printer name and the account information received by the operation panel 40, in the RAM 33. Then, in STEP S103, the CPU 31 reads the account information stored in the RAM 33. Next, in STEP S104, the CPU 31 notifies the management server 300 of the read account information, and acquires the printer information 320 including at least a printer name with respect to each printer with the same account information as the read account information from the management server 300. Therefore, when it is determined in STEP S201 whether there is a same name printer in the printer information 320, the object of determination is limited to printers with the same account information as the account information stored in the RAM 33. As a result, it is possible to reduce time for the determination of STEP S201.

Also, in the case of determining that the registration of the printer name has been prohibited (YES in STEP S106), in STEP S108, the CPU 31 notifies the user that it is not possible to use the printer name received in STEP S101, through the operation panel 40. Therefore, the user can see that although the CPU 31 has received the printer name and the account information input from the operation panel 40 in STEP S101, it is not possible to use the printer name input from the operation panel 40.

Also, in STEP S109, the CPU 31 displays the printer name of the printer with the same account information as the read account information, on the operation panel 40. Therefore, the user can easily grasp what is available as the printer name such that there is not any other printer with the same name.

Second Exemplary Embodiment

Figure 6:
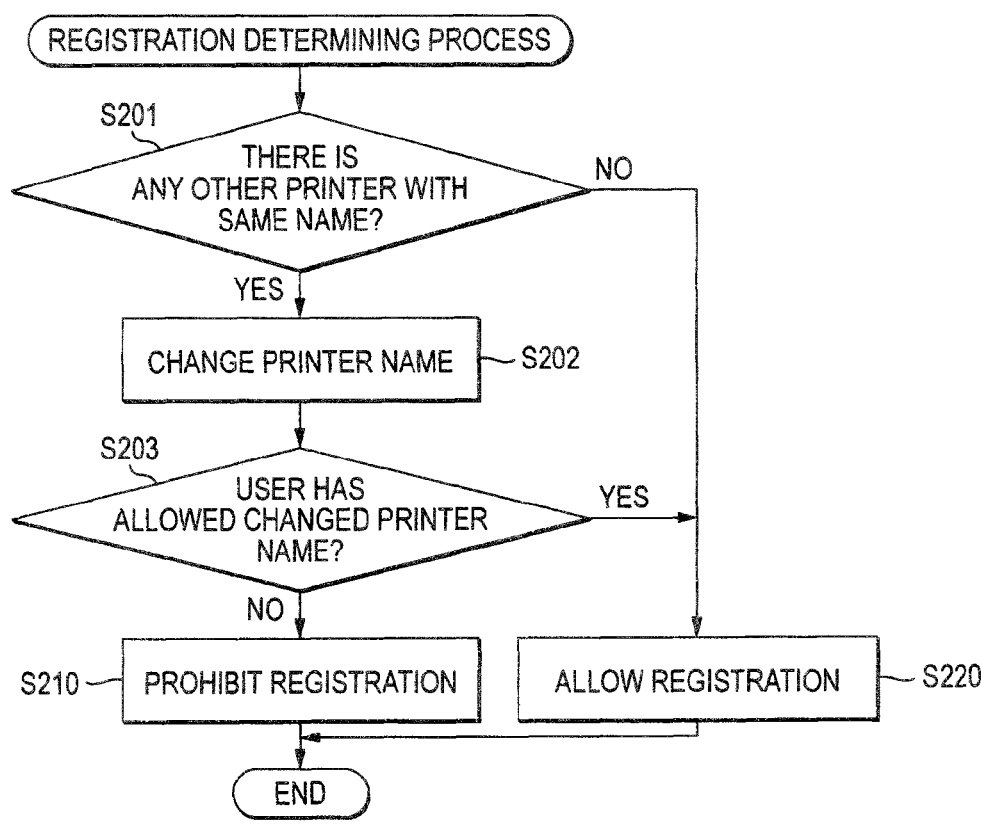
FIG. 6 is a flow chart illustrating a procedure of a registration determining process according to the second exemplary embodiment.

A registration determining process according to a second exemplary embodiment will be described with reference to FIG. 6. In the first exemplary embodiment, in the registration determining process, in the case where there is a same name printer, sign-in is prohibited. However, in the second exemplary embodiment, in the case where there is a same name printer, if the printer name is changed and the change of the printer name is allowed by the user, sip-in is allowed. Some of the same processes as those in the first exemplary embodiment may not be described.

Registration Determining Process

In a case where there is a same name printer in the printer information 320 (YES in STEP S201), in STEP S202, the CPU 31 changes the printer name of the printer 100 to another printer name which does not exist in the printer information 320 (an example of the changing unit of claims). For example, in a case where the printer name of the same name printer is 'PRINTER 1', the CPU 31 adds three arbitrarily generated alphabets to the printer name of the printer 100, thereby changing the printer name to 'PRINTER1_ABC'.

Next, in STEP S203, the CPU 31 inquires of the user about whether to allow the changed printer name. In a case where the user allows the changed printer name in response to the inquiry (YES in STEP S203), the CPU 31 allows the registration of the printer name in STEP S220, and terminates the registration determining process.

Meanwhile, in a case where the user does not allow the changed printer name in response to the inquiry (NO in STEP S203), the CPU 31 prohibits the registration of the printer name in STEP S210, and terminates the registration determining process.

Effects of Second Exemplary Embodiment

As described above in detail, in a printing apparatus according to the second exemplary embodiment, in STEP S202, the CPU 31 changes the printer name of the printer 100 to another printer name which does not exist in the printer information 320. Next, in STEP S203, the CPU 31 inquires of the user about whether to allow the changed printer name. In a case where the user allows the changed printer name in response to the inquiry (YES in STEP S203), the CPU 31 allows the registration of the printer name in STEP S220. Therefore, a same name printer does not exist. As a result, it is possible to reduce a possibility that printing may be performed in an unintended printer.

Third Exemplary Embodiment

Figure 7:
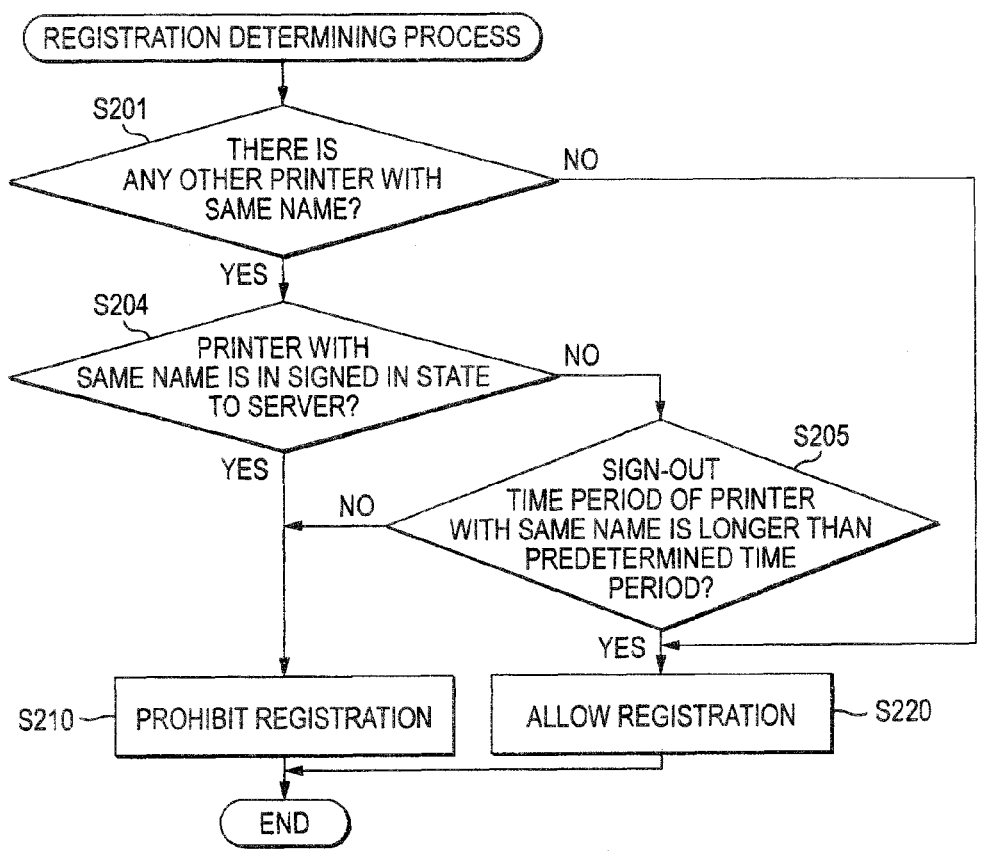
FIG. 7 is a flow chart illustrating a procedure of a registration determining process according to the third exemplary embodiment.

A registration determining process according to a third exemplary embodiment will be described with reference to FIG. 7. Unlike in the first exemplary embodiment and the second exemplary embodiment, in the third exemplary embodiment, in the case where there is a same name printer, the CPU 31 allows sign-in on the basis of the state of another printer that is signed in to the management server 300. As the state of the other printer, there are two examples. One is whether the other printer is in the signed in state to the management server 300, and the other is an elapsed time period from when the other printer has signed out from the management server 300.

Also, unlike in the first exemplary embodiment and the second exemplary embodiment, as shown in FIG. 3, the printer information 320 includes information on a connection situation and information on a connection history, in addition to a printer name. Some of the same processes as those in the first exemplary embodiment and the second exemplary embodiment may not be described.

Registration Determining Process

In a case where it is determined that there is a same name printer in the printer information 320 (YES in STEP S201), in STEP S204, the CPU 31 determines whether the same name printer is in the signed in state to the management server 300 (an example of a connection determining unit). The determination of STEP S204 is performed with reference to the printer information 320. In a case where information on the connection situation of the printer information 320 represents that the same name printer is connected, in STEP S204, the CPU 31 determines that the same name printer is in the signed in state. Meanwhile, in a case where there is no connection history in the printer information 320, the CPU 31 determines that the same name printer is not in the signed in state.

Also, the printer information 320 includes information on printers having signed in to the management server 300. Therefore, in STEP S201, the CPU 31 searches the printers having ever signed in to the management server 300 in the past to determine whether there is any other printer with the same name in the printer information 320. In other words, the determination of STEP S204 performed after the determination of STEP S201 is equivalent to determination on whether a printer having ever signed in to the management server 300 in the past is in the signed in state.

In a case of determining that the same name printer is in the signed in state to the management server 300 (YES in STEP S204), the CPU 31 prohibits registration of the printer name in STEP S210, and terminates the registration determining process.

Meanwhile, in a case where the same name printer is not in the signed in state to the management server 300 (NO in STEP S204), in STEP S205, the CPU 31 determines whether the elapsed time period from the sign-out of the same name printer from the management server 300 (hereinafter, referred to as a sign-out time period) (an example of a non-connection time period of claims) is longer than a predetermined time period.

Here, the predetermined time period is, for example, a time period from the previous sign-out time to the next sign-in time of the same name printer obtained from log information of the sign-in and sign-out of the printer. This predetermined time period can be obtained from the information on the connection situation and the information on the connection history. For example, in FIG. 3, referring to the information on the connection history, the previous sign-out time of the printer 102 having the printer name 'PRINTER1' is 8 o'clock on Dec. 1, 2010, and the next sign-in time thereof is 9 o'clock on Dec. 1, 2010. Therefore, the predetermined time period is 1 hour. Meanwhile, the information on the connection situation represents that the printer 102 having the printer name 'PRINTER1' was disconnected at 10 o'clock on Dec. 1, 2010. If the printer 100 had made a sign-in request at 10 o'clock on Jan. 2, 2011, the sign-out time period of the printer 102 having the printer name 'PRINTER1' would be 30 days or more. Therefore, since the sign-out time period is longer than 1 hour which is the predetermined time period, in STEP S205, the CPU 31 determines that the sign-out time period is longer than the predetermined time period (YES in STEP S205).

In a case of determining that the sign-out time period is not longer than the predetermined time period (NO in STEP S205), the CPU 31 prohibits registration of the printer name in STEP S210, and terminates the registration determining process. This is because if the sign-out time period is not longer than the predetermined time period, due to the tendency of user's use, it is likely that the printer with the same name as the printer name of the printer 100 will sign in.

Also, in the case of determining that the sign-out time period is longer than the predetermined time period (YES in STEP S205), the CPU 31 allows the registration of the printer name in STEP S220, and terminates the registration determining process. This is because it is considered that due to the tendency of user's use, it is unlikely that the printer with the same name as the printer name of the printer 100 will sign in.

Effects of Third Exemplary Embodiment

As described above, in a printing apparatus according to the third exemplary embodiment, even in a case of determining that there is a same name printer in the printer information 320 (YES in STEP S201), if it is determined that the same name printer is not in the signed in state to the management server 300 (NO in STEP S204), the CPU 31 allows the registration of the printer name in STEP S220. For example, if the same name printer is not connected to the network, the same name printer cannot receive any print data through the network. Therefore, in the case where the same name printer is not in the signed in state to the management server 300, a possibility that the printer 100 and the same name printer will be confusing is reduced. Therefore, it is possible to increase a possibility that printing will be performed by the user's intended printer.

Also, even in the case of determining that the same name printer is not in the signed in state to the management server 300 (NO in STEP S204), if it is determined that the sign-out time period is longer than the predetermined time period (YES in STEP S205), the CPU 31 allows the registration of the printer name in STEP S220. Therefore, it is possible to prevent printing from being performed by the same name printer unintended by the user while ensuring the user convenience by avoiding a situation in which printing by the same name printer is always not possible.

Fourth Exemplary Embodiment

Figure 8:
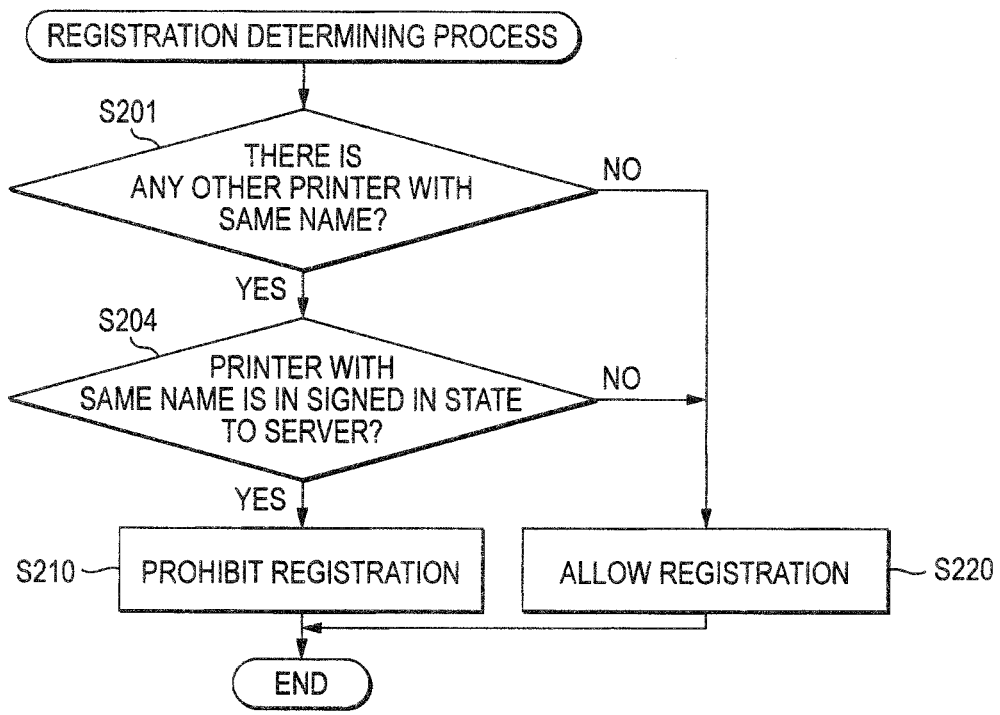
FIG. 8 is a modification of the flow chart illustrating the procedure of the registration determining process according to the third exemplary embodiment.

A registration determining process according to a fourth exemplary embodiment will be described with reference to FIG. 8. The fourth exemplary embodiment is obtained by omitting the determination process of STEP S205 of the CPU 31 on whether the sign-out period of the same name printer from the management server 300 is longer than the predetermined time period in the third exemplary embodiment.

Registration Determining Process

In the case of determining that there is a same name printer in the printer information 320 (YES in STEP S201), in STEP S204, the CPU 31 determines whether the same name printer is in the signed in state to the management server 300.

In a case of determining that the same name printer is in the signed in state to the management server 300 (YES in STEP S204), the CPU 31 prohibits registration of the printer name in STEP S210 and terminates the registration determining process.

Meanwhile, in the case of determining that the printer with the same name is not in the signed in state to the management server 300 (NO in STEP S204), the CPU 31 allows the registration of the printer name in STEP S220 and terminates the registration determining process.

Effects of Fourth Exemplary Embodiment

As described above in detail, in a printing apparatus according to the fourth exemplary embodiment, in the case of determining that the same name printer is not in the signed in state to the management server 300 (NO in STEP S204), the CPU 31 allows the registration of the printer name in STEP S220, and terminates the registration determining process. For example, if the same name printer is not connected to the network, the same name printer cannot receive any print data through the network. Therefore, in the case where the same name printer is not in the signed in state to the management server 300, a possibility that the printer 100 and the same name printer will be confusing is reduced. Therefore, it is possible to increase a possibility that printing will be performed by the user's intended printer.

Fifth Exemplary Embodiment

Figure 9:
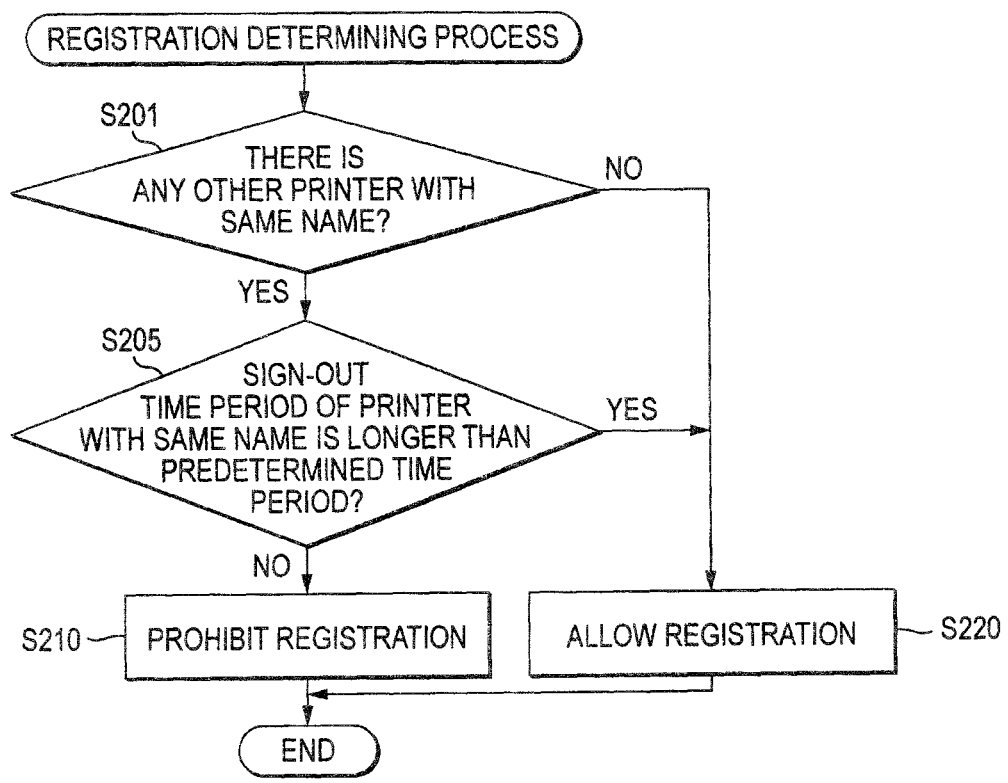
FIG. 9 is another modification of the flow chart illustrating the procedure of the registration determining process according to the third exemplary embodiment.

A registration determining process according to a fifth exemplary embodiment will be described with reference to FIG. 9. The fifth exemplary embodiment is obtained by omitting the determination process of STEP S204 of the CPU 31 on whether the same name printer is in the signed in state to the management server 300 in the third exemplary embodiment.

Registration Determining Process

In the case of determining that there is a same name printer in the printer information 320 (YES in STEP S201), in STEP S205, the CPU 31 determines whether the sign-out period of the same name printer from the management server 300 is longer than the predetermined time period.

In the case of determining that the sign-out tune period is not longer than the predetermined time period (NO in STEP S205), the CPU 31 prohibits registration of the printer name in STEP S210 and terminates the registration determining process.

Meanwhile, in the case of determining that the sign-out time period is longer than the predetermined time period (YES in STEP S205), the CPU 31 allows the registration of the printer name in STEP S220 and terminates the registration determining process.

Effects of Fifth Exemplary Embodiment

As described above in detail, in a printing apparatus according to the fifth exemplary embodiment, even in the case of determining that the same name printer is not in the signed in state to the management server 300 (NO in STEP S204), if it is determined that the sign-out time period is longer than the predetermined time period (YES in STEP S205), the CPU 31 allows the registration of the printer name in STEP S220. Therefore, it is possible to prevent printing from being performed by the printer with the same name unintended by the user while ensuring the user convenience by avoiding a situation in which printing by the same name printer is always impossible, Modifications The above-mentioned embodiments are merely illustrative and not restrictive of the present invention. Therefore, needless to say, the present invention can be improved and modified within a scope which does not diverge from the gist. For example, the printer needs only to have the printing function, and thus the present invention can be applied to a multi-function apparatus or a copy machine.

Also, in the above-mentioned embodiments, the management server 300 is connected to an Internet line. However, the present invention is not limited thereto. For example, the management server 300 may be connected to a network such as a WAN or a LAN.

Also, in the above-mentioned embodiments, the management server 300 is a server provided by the partner company. However, the present invention is not limited thereto. For example, a server provided by the vendor may be used, or a server provided by the partner company and a server provided by the vendor may cooperate.

In the above-mentioned embodiments, the user directly inputs the printer name, the account information, and the like from the operation panel 40. However, the present invention is not limited thereto. For example, it is possible to input the printer name, the account information and the like by remote control from the operation panel 40.

Also, in the above-mentioned embodiments, in the sign-in process, sign-in is prohibited. However, the present invention is not limited thereto. For example, sign-in may be allowed, and in a case of receiving print data, the CPU 31 may cooperate with the network interface 37 or the USB interface 38, thereby prohibiting reception of the print data (an example of the prohibiting unit of claims).

Also, in the above-mentioned embodiments, the flash memory 34 is used as a non-volatile memory. However, the present invention is not limited thereto. For example, a non-volatile RAM (NVRAM) may be used.

Also, in the above-mentioned embodiments, display of a message on the operation panel 40 is used to notify the user that sign-in is not possible since there is a same name printer. However, the present invention is not limited thereto. For example, instead of the message, sound or light may be used for the notification to the user. Alternatively, it is possible to register an e-mail address or the like and send the notification to a predetermined PC, a smart phone, or the like.

Also, in the above-mentioned embodiments, the printer 100 downloads the printer information 320 and determines whether there is a same name printer. However, the present invention is not limited thereto. For example, the printer 100 may inquire of the management server 300, and the management server 300 may determine whether there is a same name printer on the basis of the printer information 320. Alternatively, the printer 100 may regularly download the printer information 320, thereby regularly updating the printer information 320.

Also, in the above-mentioned embodiments, in the sign-in process, in the case of prohibiting the registration of the printer name, sign-in to the management server 300 is not performed such that printing of print data is prohibited. However, the present invention is not limited thereto. For example, sign-in to the management server 300 may be performed, but printing of print data may be prohibited (an example of the prohibiting unit). Alternatively, sign-in to the management server 300 may be performed, and a password may be added to print data such that the print data cannot be printed until the added password is input (an example of the prohibiting unit). Also, in a case of a configuration in which the printer 100 acquires print data from the management server 300, the printer 100 may be prohibited from acquiring print data from the management server 300 (an example of the prohibiting unit).

Also, in the present embodiment, in the sign-in process, the printer name is received. However, the present invention is not limited thereto. For example, in a process separate from the sign-in process, the printer name may be received. Further, the sign-in process of any one of the above-mentioned embodiments may be performed at a first sign-in, and reception of the printer name may be skipped in the sign-in process of any one of the above-mentioned embodiments at second and subsequent sign-ins. In other words, during the second and subsequent sign-ins, the user can skip input of the printer name.

Also, in the above-mentioned embodiments, in the sign-in process, in the case where the registration of the printer name is prohibited (YES in STEP S106), the list of the names of printers with the same account is displayed in STEP S109. However, the present invention is not limited thereto. For example, candidates of the names of printers with different accounts may be displayed.

Also, in the above-mentioned embodiments, in STEP S104, the CPU 31 acquires the printer information 320 including at least a printer name with respect to each printer with the same account information as the read account information, from the management server 300. However, the present invention is not limited thereto. For example, the CPU 31 may acquire the printer information 320 including at least a printer name with respect to each printer which is in the signed in state to the management server 300, from the management server 300. According to this configuration, when the CPU 31 determines whether there is a same name printer in the printer information 320 in STEP S201, the determination is limited to printers that are in the signed in state to the management server 300. Therefore, it is possible to reduce time for the determination of STEP S201. Alternatively, the combination of them may be used such that the CPU 31 acquires the printer information 320 including at least a printer name with respect to each printer with the same account information as the read account information and each printer that is in the signed in state to the management server 300, from the management server 300.

Also, in the above-mentioned embodiments, the predetermined time period is a time period from the previous sign-out time to the next sign-in time of the same name printer. However, the present invention is not limited thereto. For example, the predetermined time period may be a time period set in the flash memory 34 during the shipment of the printer from a factory or may be a time period set by the user.

Also, in the above-mentioned embodiments, the CPU 31 adds three arbitrarily generated alphabets to the printer name of the printer 100, thereby changing the printer name to 'PRINTER1_ABC'. However, the present invention is not limited thereto. For example, a portion of the account information may be added to the printer name of the printer 100 or information representing the place where the printer is installed may be added.

Also, in the above-mentioned embodiments, in the case of determining that the sign-out time period is longer than the predetermined time period (YES in STEP S205), the CPU 31 allows the registration of the printer name in STEP S220. However, the present invention is not limited thereto. For example, without allowing the registration of the printer name, the printer name may be treated as a temporary printer name and only sign-in may be allowed. Also in this case, if there is a same name printer, printing of print data is not performed. As a result, it is possible to prevent printing from being performed by the same name printer unintended by the user. Also, since sign-in is just temporarily allowed, when sign-in is tried in the future, the user is requested to register the printer name again, and if the same name printer is in the signed in state, change of the printer name is requested.

What is claimed is:

1. A printing apparatus comprising:
   a connecting unit connected to a management server through a network;
   a printing unit configured to print data received through the network;
   a receiving unit configured to receive input of a name indicating the printing apparatus and user account information, the user account information being used to sign in to the management server;
   a processor; and
   a memory storing instructions, when executed by the processor, causing the printing apparatus to:
   determine whether a name of another printing apparatus having a same name as the name received by the receiving unit is registered in the management server, the other printing apparatus having signed into the management server with the same user account information as the printing apparatus,
   register the name received by the receiving unit in the management server, if the name of the other printing apparatus having the same name as the name received by the receiving unit is not registered in the management server, and
   not register the name received by the receiving unit in the management server, if the name of the other printing apparatus having the same name as the name received by the receiving unit is registered in the management server.

2. The printing apparatus according to claim 1,
wherein the memory further stores instructions, when executed by the processor, causing the printing apparatus to:
   change the name received by the receiving unit to a different name, if the name of the other printing apparatus having the same name as the name received by the receiving unit is registered in the management server, and
   register the changed name in the management server if the name received by the receiving unit has been changed to a different name.

3. The printing apparatus according to claim 1, further comprising:
   a notifying unit configured to notify that the same name received by the receiving unit cannot be used as the name of the printing apparatus if it is determined that the name of the other printing apparatus having the same name as the name received by the receiving unit is registered in the management server.

4. The printing apparatus according to claim 3,
wherein the notifying unit notifies a list of names which are used as names of printing apparatuses.

5. The printing apparatus according to claim 1, further comprising:
   a transmitting unit configured to transmit connection information for signing in to the management server,
wherein the memory further stores instructions, when executed by the processor, causing the printing apparatus to:
   prohibit the transmitting unit from transmitting the connection information, if the name of the other printing apparatus having the same name as the name received by the receiving unit is registered in the management server, and
   not prohibit the transmitting unit from transmitting the connection information, if the name of the other printing apparatus having the same name as the name received by the receiving unit is not registered in the management server.

6. The printing apparatus according to claim 1,
wherein the memory further stores instructions, when executed by the processor, causing the printing apparatus to:
   determine whether the name of the other printing apparatus having the same name as the name received by the receiving unit is registered in the management server by using printer information which includes a list of names of printing apparatuses.

7. The printing apparatus according to claim 6,
wherein the printer information includes the list of names of the printing apparatuses having the same user account information as the user account information received by the receiving unit.

8. The printing apparatus according to claim 1,
wherein the name indicating the printing apparatus includes a model name determined by a maker of the printing apparatus or a name arbitrarily determined by a user.

* * * * *